US010718616B2

(12) United States Patent
Itabashi et al.

(10) Patent No.: US 10,718,616 B2
(45) Date of Patent: Jul. 21, 2020

(54) PATROL ROUTE SETTING APPARATUS, PATROL ROUTE SETTING METHOD, AND NON-TRANSITORY STORAGE MEDIUM

(71) Applicant: SUBARU CORPORATION, Tokyo (JP)

(72) Inventors: Naoaki Itabashi, Tokyo (JP); Satoshi Okada, Tokyo (JP); Tsunahiro Sato, Tokyo (JP); Satoshi Hoshino, Tokyo (JP); Takeshi Katsumoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 178 days.

(21) Appl. No.: 15/920,360

(22) Filed: Mar. 13, 2018

(65) Prior Publication Data

US 2018/0283870 A1 Oct. 4, 2018

(30) Foreign Application Priority Data

Mar. 30, 2017 (JP) .................................. 2017-066862

(51) Int. Cl.
*G01C 21/00* (2006.01)
*G01C 21/20* (2006.01)
*G01C 23/00* (2006.01)

(52) U.S. Cl.
CPC ............. *G01C 21/00* (2013.01); *G01C 21/20* (2013.01); *G01C 23/005* (2013.01)

(58) Field of Classification Search
CPC ...... G01C 21/00; G01C 21/005; G01C 21/20; G01C 23/005; G08G 5/00; G08G 5/0039;
(Continued)

(56) References Cited

U.S. PATENT DOCUMENTS 7,194,353 B1 * 3/2007 Baldwin ................ G01C 21/00
701/528
9,711,052 B2 * 7/2017 Mizutani ............... G08G 5/0034
(Continued)

FOREIGN PATENT DOCUMENTS

| JP | 2013-080396 A | | 5/2013 | |
| JP | 2015001377 A | * | 1/2015 | |
| WO | WO-2010043428 A2 | * | 4/2010 | .......... G01S 3/8083 |

OTHER PUBLICATIONS

Mizutani T., Otoi K., Machine Translation of JP2015001377A, "Flight Route Searching Apparatus, and Flight Route Searching Program" (Year: 2015).*
(Continued)

*Primary Examiner* — Anne Marie Antonucci
*Assistant Examiner* — Sahar Motazedi
(74) *Attorney, Agent, or Firm* — McDermott Will & Emery LLP

(57) ABSTRACT

A patrol route setting apparatus includes a cell divider, a probability distribution setter, a random number generator, a destination setter, a route setter, and a probability distribution updating unit. The cell divider divides map information into cells. The probability distribution setter sets, for each cell, a probability distribution of a presence probability of a capturing target in the cell. The destination setter that sets, as a destination, any, of the cells, that has a greatest first value, of the presence probability, corresponding to a random number generated by the random number generator, on the basis of the probability distributions. The probability distribution updating unit updates, on the basis of presence information of the capturing target acquired by an information acquiring unit, the probability distributions of the presence probability of the capturing target, when the movable
(Continued)

body travels along the traveling route to the destination set by the route setter.

18 Claims, 7 Drawing Sheets

(58) Field of Classification Search
CPC ..... G05B 19/042; B64C 39/02; B64C 39/024; B64C 2201/141
See application file for complete search history.

(56) References Cited

U.S. PATENT DOCUMENTS

| | | | | |
|---|---|---|---|---|
| 9,799,226 | B2* | 10/2017 | Mizutani | ................ G01C 21/20 |
| 10,102,636 | B2* | 10/2018 | Murata | ................... G06T 7/277 |
| 2005/0071081 | A1* | 3/2005 | Hirose | ................... G01C 21/20 |
| | | | | 701/414 |
| 2006/0116814 | A1* | 6/2006 | Milbert | ................... G01C 21/20 |
| | | | | 701/416 |
| 2010/0106398 | A1* | 4/2010 | Eisele | ..................... G01C 21/20 |
| | | | | 701/532 |
| 2013/0124089 | A1* | 5/2013 | Herman | ................. G01C 21/20 |
| | | | | 701/528 |
| 2014/0163772 | A1* | 6/2014 | Vian | .................... G05D 1/0094 |
| | | | | 701/2 |
| 2016/0210863 | A1* | 7/2016 | Kohn-Rich | .......... G05D 1/0646 |
| 2018/0047174 | A1* | 2/2018 | Murata | .................... G06T 7/277 |
| 2019/0005829 | A1* | 1/2019 | Itabashi | ............... G05D 1/0202 |

OTHER PUBLICATIONS

Gilkerson J., et. al., PDF file of PowerPoint slides, "An Introduction to Random Number Generators and Monte Carlo Methods" (Year: 2005).*

* cited by examiner

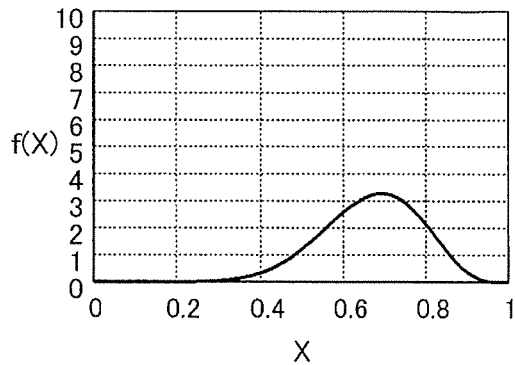
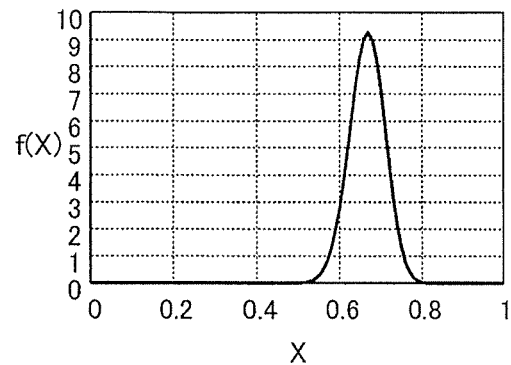
FIG. 6A  FIG. 6B
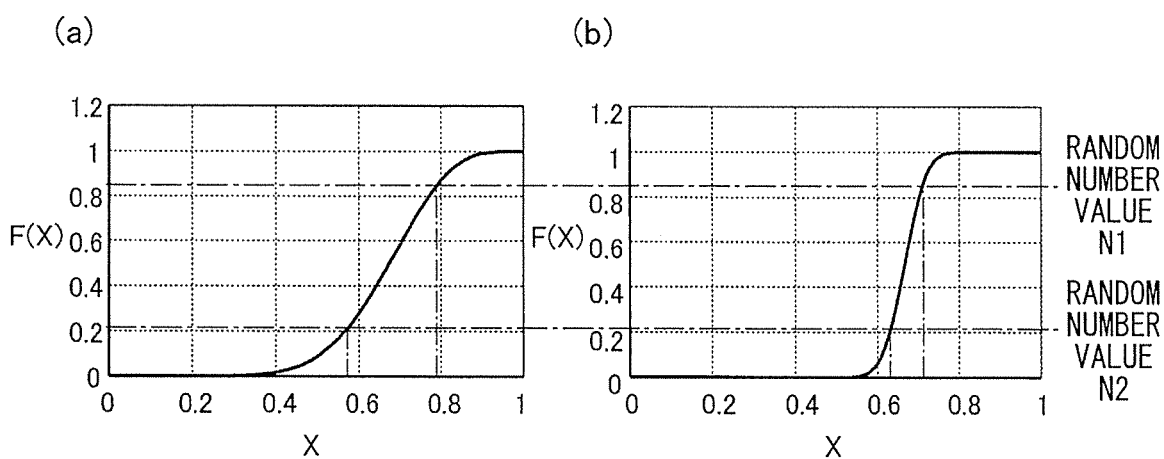
FIG. 7

PATROL ROUTE SETTING APPARATUS, PATROL ROUTE SETTING METHOD, AND NON-TRANSITORY STORAGE MEDIUM

CROSS-REFERENCE TO RELATED APPLICATIONS

The present application claims priority from Japanese Patent Application No. 2017-066862 filed on Mar. 30, 2017, the entire contents of which are hereby incorporated by reference.

BACKGROUND

The technology relates to a technique that causes a movable body to perform patrol in a predetermined region, and is particularly utilizable in performing efficient patrol to capture a particular target to be captured.

A technique that causes a movable body to perform patrol in order to capture a particular target to be captured is disclosed, for example, in Japanese Unexamined Patent Application No. 2013-80396. The movable body may be, for example but not limited to, an aircraft.

SUMMARY

It is desired to perform efficient patrol in a field of the technology.

It is desirable to provide a patrol route setting apparatus, a patrol route setting method, and a non-transitory storage medium that achieve efficient patrol.

An aspect of the technology provides a patrol route setting apparatus including a cell divider, a probability distribution setter, a random number generator, a destination setter, a route setter, and a probability distribution updating unit. The cell divider is configured to divide map information into a plurality of cells in a horizontal plane. The map information includes a predetermined patrol region. The probability distribution setter is configured to set, for each of the cells, a probability distribution of a presence probability of a capturing target in the relevant cell. The capturing target is a target to be captured. The random number generator is configured to generate a random number. The destination setter is configured to set, as a destination, any, of the cells, that has a greatest first value of first values of the respective cells, on the basis of the probability distributions set for the respective cells. The first value is a value of the presence probability corresponding to the random number generated by the random number generator. The route setter is configured to set a traveling route from a current location of a movable body to the destination. The probability distribution updating unit is configured to update, on the basis of presence information, the probability distributions of the presence probability of the capturing target set for the respective cells, when the movable body travels along the traveling route set by the route setter. The presence information is information regarding presence of the capturing target around the movable body. The presence information is acquired by an information acquiring unit mounted on the movable body.

An aspect of the technology provides a patrol route setting method including: dividing map information into a plurality of cells in a horizontal plane, the map information including a predetermined patrol region; setting, for each of the cells, a probability distribution of a presence probability of a capturing target in the relevant cell, the capturing target being a target to be captured; generating a random number; setting, as a destination, any, of the cells, that has a greatest first value of first values of the respective cells, on the basis of the probability distributions set for the respective cells, the first value being a value of the presence probability corresponding to the generated random number; setting a traveling route from a current location of a movable body to the destination; and updating, on the basis of presence information, the probability distributions of the presence probability of the capturing target set for the respective cells, when the movable body travels along the set traveling route, the presence information being information regarding presence of the capturing target around the movable body, the presence information being acquired by an information acquiring unit mounted on the movable body.

An aspect of the technology provides a non-transitory storage medium that includes a patrol route setting program embodied therein. The patrol route setting program causes, when executed by a computer, the computer to implement a method. The method includes: dividing map information into a plurality of cells in a horizontal plane, the map information including a predetermined patrol region; setting, for each of the cells, a probability distribution of a presence probability of a capturing target in the relevant cell, the capturing target being a target to be captured; generating a random number; setting, as a destination, any, of the cells, that has a greatest first value of first values of the respective cells, on the basis of the probability distributions set for the respective cells, the first value being a value of the presence probability corresponding to the generated random number; setting a traveling route from a current location of a movable body to the destination; and updating, on the basis of presence information, the probability distributions of the presence probability of the capturing target set for the respective cells, when the movable body travels along the set traveling route, the presence information being information regarding presence of the capturing target around the movable body, the presence information being acquired by an information acquiring unit mounted on the movable body.

An aspect of the technology provides a patrol route setting apparatus including circuitry. The circuitry is configured to divide map information into a plurality of cells in a horizontal plane. The map information includes a predetermined patrol region. The circuitry is configured to set, for each of the cells, a probability distribution of a presence probability of a capturing target in the relevant cell. The capturing target is a target to be captured. The circuitry is configured to generate a random number. The circuitry is configured to set, as a destination, any, of the cells, that has a greatest first value of first values of the respective cells, on the basis of the probability distributions set for the respective cells. The first value is a value of the presence probability corresponding to the generated random number. The circuitry is configured to set a traveling route from a current location of a movable body to the destination. The circuitry is configured to update, on the basis of presence information, the probability distributions of the presence probability of the capturing target set for the respective cells, when the movable body travels along the set traveling route. The presence information is information regarding presence of the capturing target around the movable body. The presence information is acquired by an information acquiring unit mounted on the movable body.

BRIEF DESCRIPTION OF THE DRAWINGS

FIGS. 6A and 6B are each a diagram illustrating an example of a probability density mathematical function to be set for each cell in the presence probability map.

Parts (a) and (b) of FIG. 7 are each a diagram illustrating an example of a cumulative distribution mathematical function that is an integral of the probability density mathematical function illustrated in corresponding one of FIGS. 6A and 6B.

Figure 4:
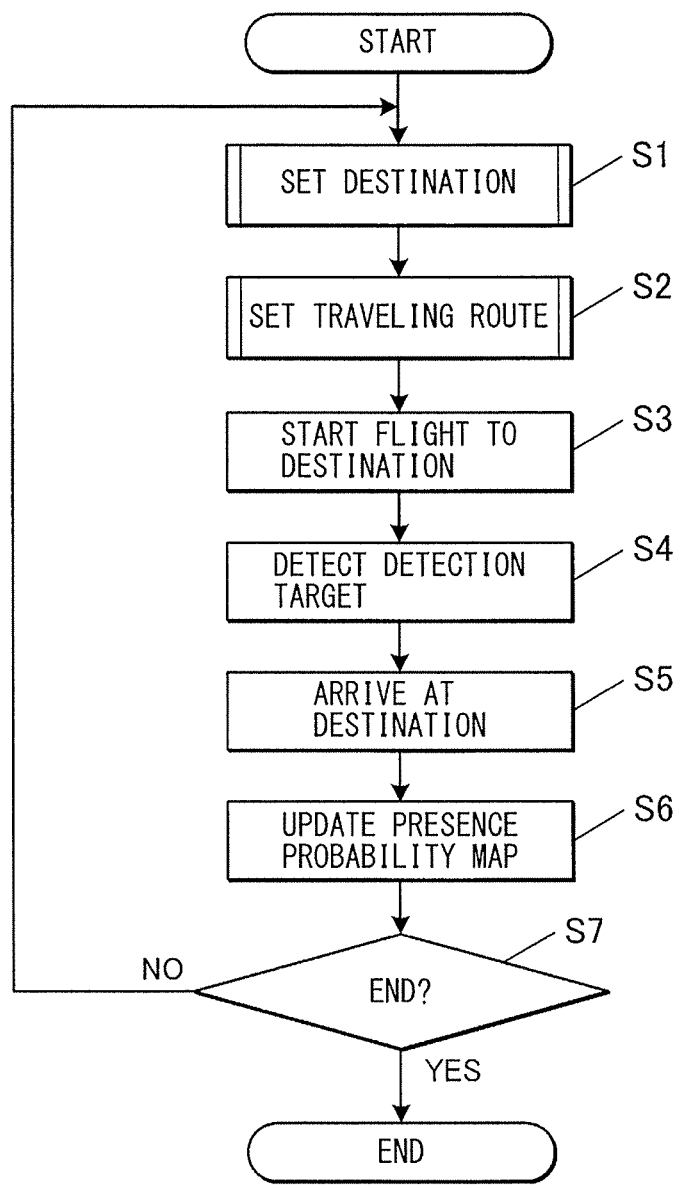
FIG. 4 is a flowchart illustrating an example of a flow of a patrol route setting process according to one implementation of the technology.
Figure 8:
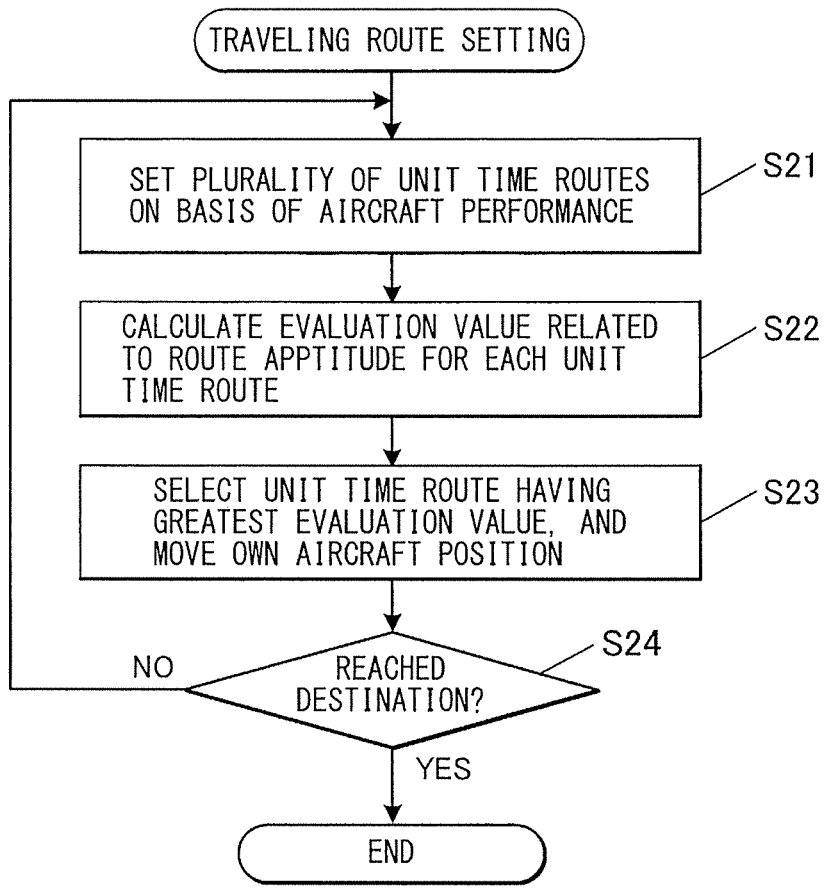

FIG. 8 is a flowchart illustrating an example of a flow of a traveling route setting process in the patrol route setting process illustrated in FIG. 4.

Figure 9:
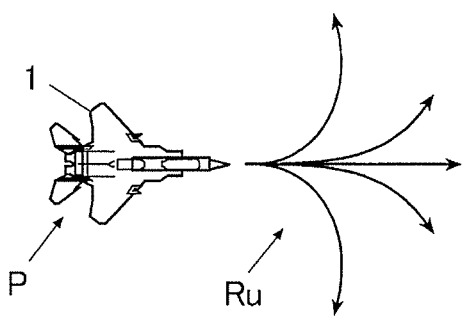

FIG. 9 is a diagram illustrating an example of a route per unit time in the traveling route setting process.

Figure 10:
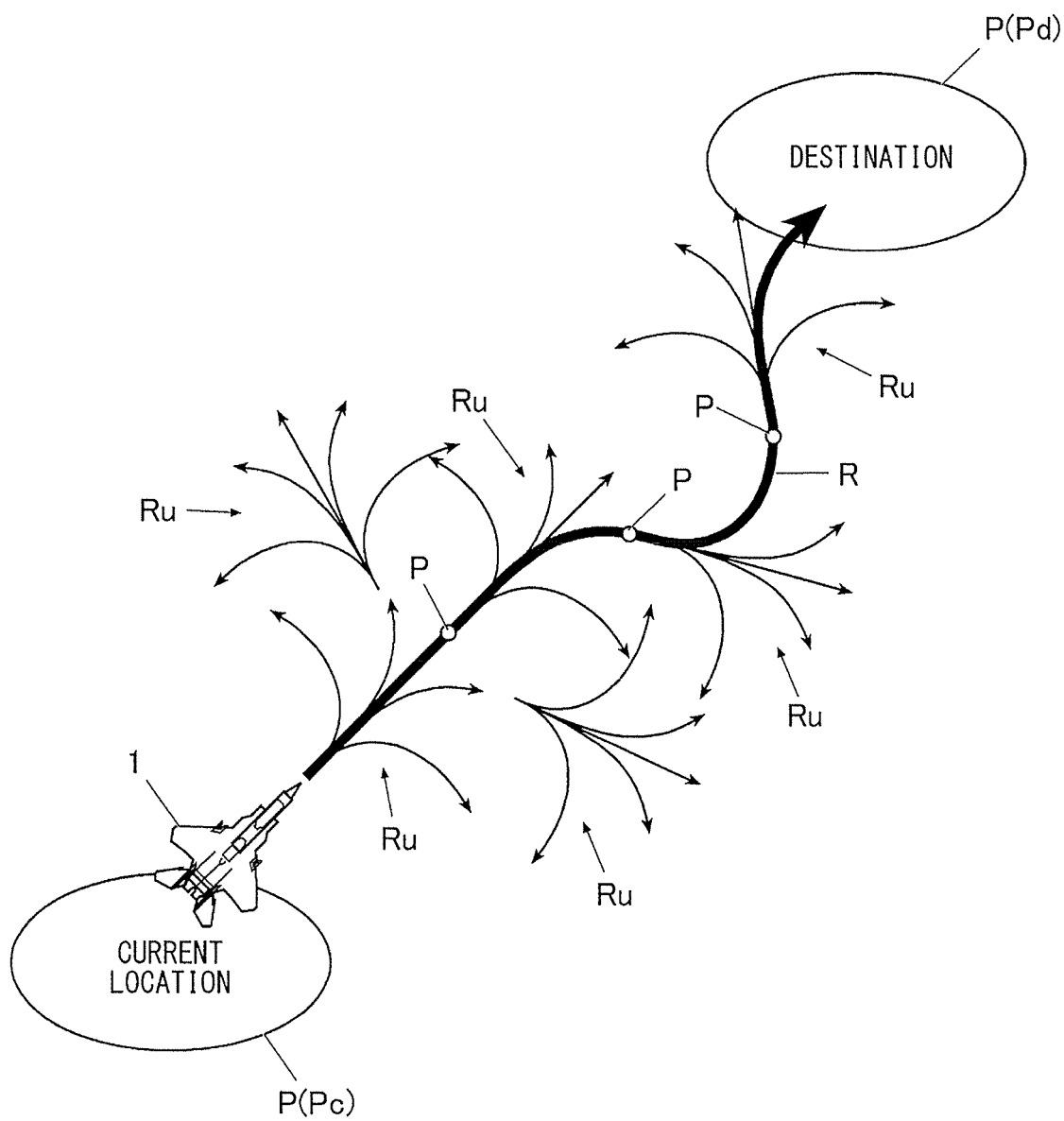

FIG. 10 is a diagram describing an example of setting of a traveling route of the aircraft from its current location to a destination in the traveling route setting process.

DETAILED DESCRIPTION

In the following, a detailed description is given, with reference to the accompanying drawings, of some non-limiting examples in which a patrol route setting apparatus according to one implementation of the technology is applied to an aircraft. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale.

[Configuration]

Figure 1:
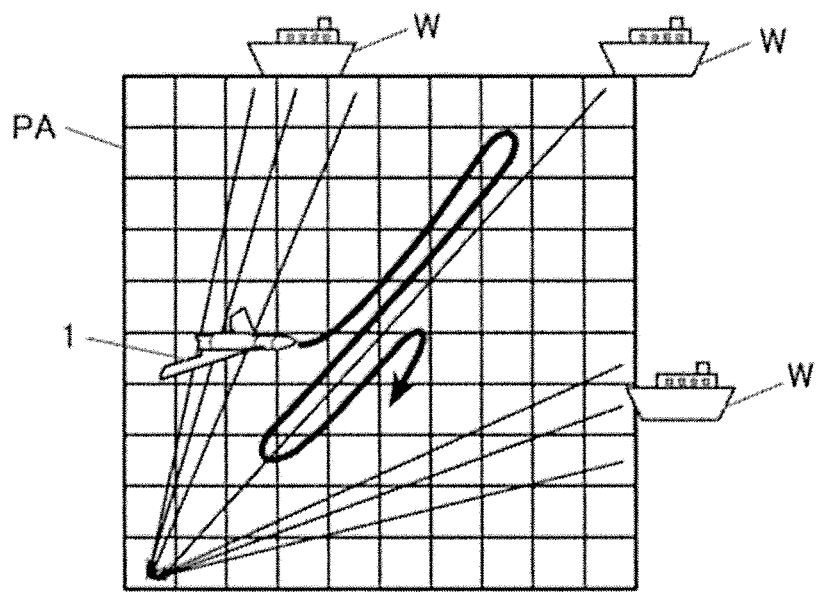
FIG. 1 is a conceptual diagram illustrating an example of routine monitoring performed at the sea by an aircraft, according to one implementation of the technology.
Figure 2:
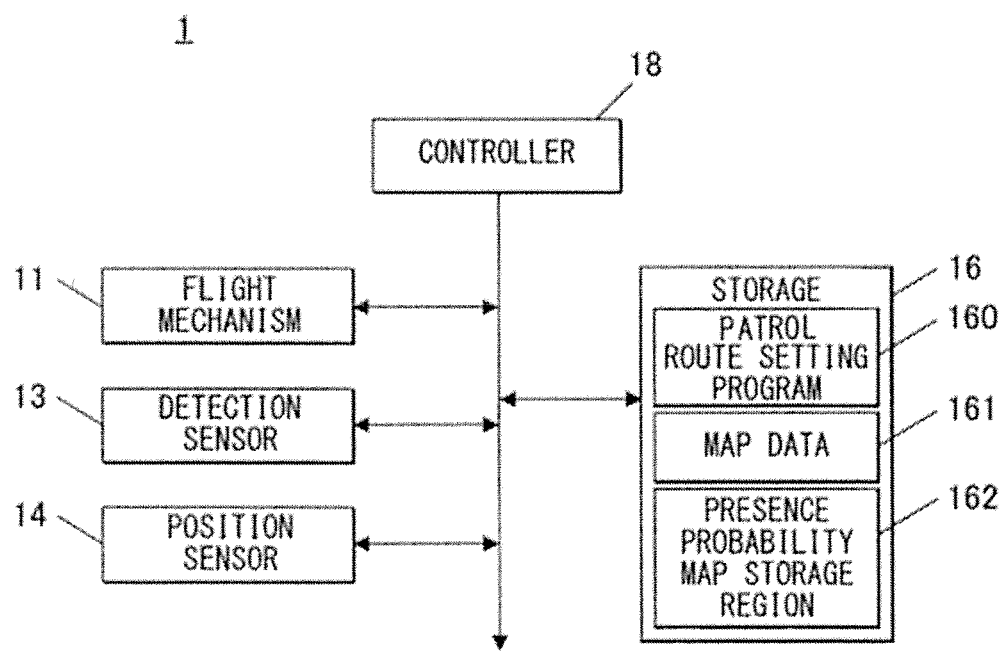
FIG. 2 is a block diagram illustrating an example of a functional configuration of the aircraft according to one implementation of the technology.
Figure 3:
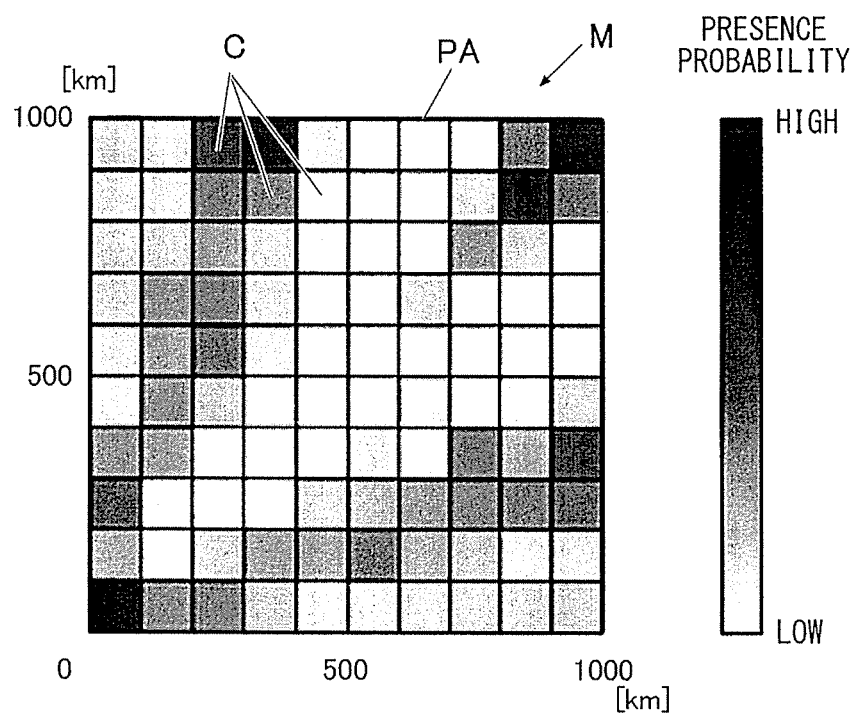
FIG. 3 is a diagram illustrating an example of a presence probability map.

A description is given first of an example of a configuration of an aircraft 1 according to one implementation of the technology, with reference to FIGS. 1 to 3.

FIG. 1 is a conceptual diagram illustrating an example of routine monitoring performed by the aircraft 1 at the sea. FIG. 2 is a block diagram illustrating an example of a functional configuration of the aircraft 1. FIG. 3 is a diagram illustrating an example of a presence probability map M which will be described later.

As illustrated in FIG. 1, the aircraft 1 in one implementation may have a role of performing the routine monitoring, i.e., performing patrol flight, in a patrol region PA and thereby capturing a particular vessel W. The patrol region PA may be, for example but not limited to, a predetermined region in the air over the sea.

For example, referring to FIG. 2, the aircraft 1 may include a flight mechanism 11, a detection sensor 13, a position sensor 14, a storage 16, and a controller 18. The flight mechanism 11 may cause the aircraft 1 to fly.

The detection sensor 13 of the foregoing components may detect the vessel W in particular in one implementation. The detection sensor 13 may be, for example but not limited to, an image sensor or radar. The detection sensor 13 may detect the vessel W on the basis of a control instruction given from the controller 18. Further, the detection sensor 13 may acquire presence information of the detected vessel W and output the acquired presence information of the detected vessel W to the controller 18.

The position sensor 14 may acquire position information of the own aircraft 1. The position sensor 14 may be, for example but not limited to, a global positioning system (GPS) receiver, or an inertial navigation system. The position sensor 14 may acquire position information of the own aircraft 1 on the basis of a control instruction given from the controller 18, and output the acquired position information of the own aircraft 1 to the controller 18.

The storage 16 may be a memory that stores a program, data, etc. used to achieve various functions of the aircraft 1, and serves as a workspace. In one implementation, the storage 16 may store a patrol route setting program 160 and map data 161 in advance.

The patrol route setting program 160 may be directed to causing the controller 18 to execute a patrol route setting process which will be described later.

The map data 161 may include comprehensive geographic information including terrain information and information on a utilization state of the land. Examples of the terrain information may include information on the sea, a river, etc. Examples of the information on the utilization state of the land may include information on a road, a railway, a building, a farmland, a key terrain, etc. It is to be noted that, however, the map data 161 may be any data as long as the data includes at least the patrol region PA of the aircraft 1.

Further, the storage 16 may have a presence probability map storage region 162 that stores the presence probability map M.

As illustrated in FIG. 3, the presence probability map M may represent a presence probability distribution in the patrol region PA. In the presence probability map M, the patrol region PA may be divided into a plurality of cells C. For each of the cells C, a probability density mathematical function, i.e., a probability distribution, related to the presence probability of the vessel W in the relevant cell C may be set. The presence probability map M may be generated and updated in the patrol route setting process which will be described later.

It is to be noted that, for simple illustration purpose, an expectation value in the probability distribution of each of the cell C is illustrated as the presence probability of the vessel W in the relevant cell C in FIG. 3.

The controller 18 may perform a central control of each unit of the aircraft 1 as illustrated in FIG. 2. For example, the controller 18 may perform a drive control of the flight mechanism 11 to thereby control the flight of the aircraft 1. Further, the controller 18 may control an operation of the detection sensor 13, the position sensor 14, or any other unit of the aircraft 1, for example. In addition, the controller 18 may read out the program stored in the storage 16, and execute various processes in accordance with the read-out program.

[Operation]

A description is given next of an operation of the aircraft 1 upon execution of the patrol route setting process.

Figure 5:
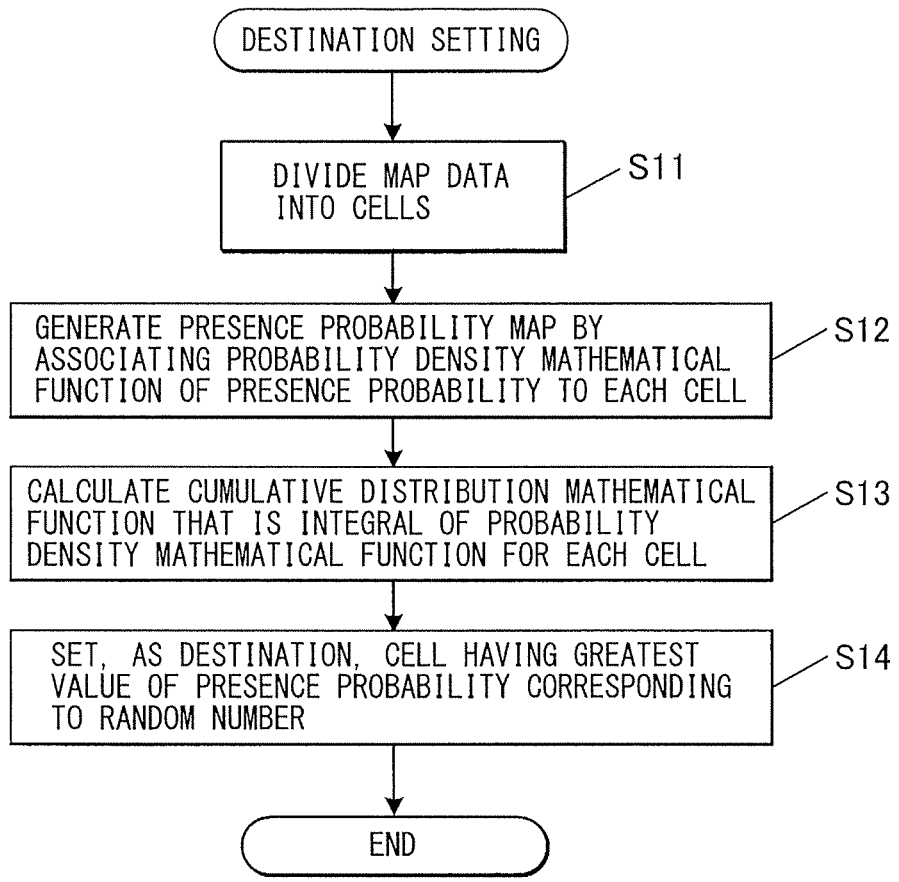
FIG. 5 is a flowchart illustrating an example of a flow of a destination setting process in the patrol route setting process illustrated in FIG. 4.

FIG. 4 is a flowchart illustrating an example of a flow of the patrol route setting process. FIG. 5 is a flowchart illustrating an example of a flow of a destination setting process, which will be described later, in the patrol route setting process. FIGS. 6A and 6B are each a diagram illustrating an example of a probability density mathematical function f(X) to be set for each of the cells C in the presence probability map M. Parts (a) and (b) of FIG. 7 are each a diagram illustrating an example of a cumulative distribution mathematical function F(X) that is an integral of the probability density mathematical function f(X) illustrated in corresponding one of FIGS. 6A and 6B.

FIG. 8 is a flowchart illustrating an example of a flow of a traveling route setting process, which will be described later, in the patrol route setting process. FIG. 9 is a diagram illustrating an example of a unit time route Ru in the traveling route setting process. FIG. 10 is a diagram describing an example of setting of a traveling route R in the traveling route setting process.

The patrol route setting process may set a patrol route of the aircraft 1 in the patrol region PA. The patrol route setting process may be executed by reading and loading of the patrol route setting program 160 by the controller 18 from the storage 16, when an instruction to execute the patrol route setting process is inputted.

It is to be noted that, in an example described below, the aircraft 1 is assumed to be in flight in the flight region PA.

Referring to FIG. 4, when the patrol route setting process is executed, first, the controller 18 may set a destination in the patrol region PA (step S1). As used herein, the term "destination" refers to a destination of the flight of the aircraft 1 at the time of setting, which is a point on the way to or at a final destination of the routine monitoring.

In the destination setting process, the destination may be so set by a probability determination method as to allow for efficient routine monitoring. The probability determination method may use, for example but not limited to, Thompson sampling.

In order to perform efficient routine monitoring, it is preferable to utilize the highly-accurate presence probability map M to perform the routine monitoring focused on a point at which the presence probability of the vessel W is high. Meanwhile, in order to generate the highly-accurate presence probability map M, it is desirable to perform patrol over the entire patrol region PA without taking into consideration the level of the presence probability.

The utilization of the presence probability map M and the generation of the presence probability map M are contradicting as described above. In one implementation, however, both the utilization of the presence probability map M and the generation of the presence probability map M are achieved by setting the destination by means of Thompson sampling using a random number and a probability distribution. Efficient routine monitoring is achieved thereby.

For example, as illustrated in FIG. 5, the controller 18 may first divide the map data 161 into a plurality of cells C in a horizontal plane, in the destination setting process (step S11). The map data 161 may include the patrol region PA. The plurality of cells C may be provided in a lattice state. Although the lattice state of the cells C is not particularly limited, the cells C may be provided in a square lattice state sectioned by dividing lines that extend in a north-south direction and a west-east direction, in one implementation.

Thereafter, the controller 18 may associate, to each of the cells C, the probability density mathematical function f(X), i.e., the probability distribution, related to the presence probability of the vessel W at a point of the relevant cell C, to thereby generate the presence probability map M (step S12). Further, the controller 18 may cause the presence probability map storage region 162 of the storage 16 to store the generated presence probability map M.

In one implementation, for example, as illustrated in FIGS. 6A and 6B, the probability density mathematical function f(X) may describe the probability density whose random variable (continuous random variable) is the presence probability X of the vessel W. The probability density is a probability that the presence probability X has a certain value.

Thereafter, the controller 18 may calculate the cumulative distribution mathematical function F(X) that is an integral of the probability density mathematical function f(X), for each of the cells C in the presence probability map M (step S13).

Thereafter, the controller 18 may set the greatest-probability cell C of the cells C as the destination, on the basis of the cumulative distribution mathematical functions F(X) of the respective cells C (step S14). The greatest-probability cell C may be the cell C, in all of the cells C in the patrol region PA, that has the greatest value of the presence probability X corresponding to a predetermined random number of the values, of the presence probability X corresponding to the predetermined random number, of all of the cells C.

For example, the controller 18 may first generate a random number including a pseudorandom number. Thereafter, the controller 18 may calculate, for each of the cells C in the presence probability map M, the value of the presence probability X when the value of the accumulation (the value of the cumulative distribution mathematical function F(X)) of the relevant cell is the value of the generated random number. Further, the controller 18 may set, as the destination, the cell C, of all of the cells C, that has the greatest value of the presence probability X as a result of the calculation.

For example, referring to Parts (a) and (b) of FIG. 7, in a case where two cells C having the respective cumulative distribution mathematical functions F(X) illustrated in Parts (a) and (b) of FIG. 7 are present, the cell C corresponding to Part (a) of FIG. 7 that has the greatest value of the presence probability X corresponding to the random number value N1 is set as the destination, for the random number value N1. In contrast, regarding the random number value N2, the cell C corresponding to Part (b) of FIG. 7 that has the greatest value of the presence probability X corresponding to the random number value N2 is set as the destination.

By thus setting the destination by utilizing the presence probability map M that represents the presence probability distribution of the vessel W in the patrol region PA, it is made easier for the cell C having the high presence probability X of the vessel W to be selected as the destination. However, by using the random number as a parameter for the selection, bias is suppressed in the selection of the destination. The bias in the selection of the destination may be, for example but not limited to, a phenomenon that only the cell C having the high presence probability X is often selected.

When the destination is set, i.e., when any of the cells C is set as the destination, the controller 18 may set the traveling route R to the destination, i.e., a destination Pd illustrated in FIG. 10, as illustrated in FIG. 4 (step S2).

In the traveling route setting process, the traveling route R may be searched taking into consideration a factor such as an aircraft performance of the aircraft 1 or the presence probability X of the vessel W.

For example, referring to FIG. 8, the controller 18 may first set a plurality of routes Ru per unit time in the horizontal plane, on the basis of the aircraft performance of the aircraft 1 (step S21). The route Ru per unit time in the horizontal plane may be simply referred to as a "unit time route Ru" hereinafter.

In one implementation, five routes illustrated in FIG. 9 may be set as the unit time routes Ru. The five routes may include: a route derived from one-minute flight from an own aircraft position P in which the aircraft 1 turns left by 60 degrees; one-minute flight from the own aircraft position P in which the aircraft 1 turns right by 60 degrees; one-minute flight from the own aircraft position P in which the aircraft 1 turns left by 30 degrees; one-minute flight from the own aircraft position P in which the aircraft 1 turns right by 30 degrees; and one-minute straight flight from the own aircraft position P. As used herein, the term "own aircraft position P" refers to a position of the aircraft 1 in the traveling route setting process. The own aircraft position P may be a current location Pc illustrated in FIG. 10 at the start of the traveling route setting process.

It is to be noted that a numerical value of a factor such as time or a bank angle for the turning flight may be appropriately set for the unit time route Ru, on the basis of the aircraft performance of the aircraft 1. The aircraft performance may include, for example but not limited to, a size of the aircraft or motion characteristics of the aircraft. In addition, the number of the unit time routes Ru to be set in step S21 is not particularly limited.

Thereafter, the controller 18 may calculate, for each of the unit time routes Ru, an evaluation value regarding aptitude for the patrol route (step S22).

For example, the evaluation value may be calculated on the basis of three factors: the presence probability X, i.e., an expectation value, of the vessel W in the cell C at a moving point; a remaining distance to the destination Pd from the moving point; and a fuel consumption amount of the aircraft 1. The foregoing moving point may be a point of a tip of the relevant unit time route Ru. The foregoing three factors may be weighted appropriately. The evaluation value may be calculated by summing the weighted values of the foregoing three factors. The foregoing calculation may be performed for each of the unit time routes Ru. The evaluation value may be greater as the presence probability X in the cell C at the moving point is higher, as the remaining distance to the destination Pd is smaller, and as the fuel consumption amount is smaller.

It is to be noted that it is sufficient that the calculation of the evaluation value is based on at least the three factors described above, i.e., the presence probability X of the vessel W, the remaining distance to the destination Pd, and the fuel consumption amount. Further, the calculation of the evaluation value may be further based on a quantified value of a surrounding environment at the moving point in addition to the three factors described above. The surrounding environment at the moving point may include, for example but not limited to, weather or presence of another aircraft.

Thereafter, the controller 18 may select the unit time route Ru, in the plurality of unit time routes Ru, that has the greatest evaluation value, and move the own aircraft position P to the point at the tip of the selected unit time route Ru (step S23).

Thereafter, the controller 18 may determine whether the own aircraft position P has reached the destination Pd by the movement in the previous step S23 (step S24). When the controller 18 determines that the own aircraft position P has reached the destination Pd (step S24: YES), the traveling route setting process may be ended.

In contrast, when the controller 18 determines that the own aircraft position P has not reached the destination Pd yet in step S24 (step S24: NO), the controller 18 may make a transition in the process to the foregoing step S21. The processes in steps S21 to S23 may be performed repeatedly until the determination is made in step S24 that the own aircraft position P has reached the destination Pd.

In such a manner, the traveling route R of the aircraft 1 from the current location Pc to the destination Pd may be searched and set as a continuous series of the unit time routes Ru that each have the greatest evaluation value for the relevant own aircraft position P, as illustrated in FIG. 10.

As described above, the setting of the plurality of unit time routes Ru based on the aircraft performance of the aircraft 1, and the selection, in the set unit time routes Ru, of the unit time route Ru that has the greatest evaluation value regarding the aptitude for the patrol route may be performed repeatedly in order. Thereby, the traveling route R may be set that causes less difficulty in view of the aircraft performance of the aircraft 1, and is superior in aptitude for the patrol route based on the factor such as the presence probability X of the vessel W or the flight distance.

When the traveling route R to the destination Pd is set, the controller 18 may cause the aircraft 1 to start flying toward the destination Pd along the set traveling route R, as illustrated in FIG. 4 (step S3).

On this occasion, the controller 18 may cause the detection sensor 13 to detect the vessel W, i.e., the detection target, on an as-needed basis during the flight along the traveling route R, and cause the storage 16 to store a result of the detection, i.e., the presence information of the vessel W (step S4).

After the aircraft 1 arrives at the destination Pd (step S5), the controller 18 may update the presence probability map M on the basis of the presence information of the vessel W stored in the storage 16 (step S6). For example, the controller 18 may update, on the basis of the presence information of the vessel W along the traveling route R, the probability density mathematical function f(X) of each of the cells C on the traveling route R in the presence probability map M stored in the presence probability map storage region 162.

The probability density mathematical function f(X) that has been thus updated has smaller deviation, and higher certainty of having the expectation value, as can be seen from FIGS. 6A and 6B. Hence, the accuracy of the presence probability map M is improved.

The latest situation of how the vessel W has appeared may be learned by thus updating the presence probability map M on the basis of the presence information of the vessel W acquired during the traveling. This makes it possible to improve accuracy of prediction regarding the presence of the vessel W.

Thereafter, the controller 18 may determine whether to end the patrol route setting process (step S7). When the determination is made not to end the patrol route setting process (step S7: NO), the controller 18 may cause the process to make a transition to the foregoing step S1, and set the next destination Pd.

In such a manner, the setting of the destination Pd and the traveling route R to the set destination Pd, the flight along the set traveling route R, the acquisition of the presence information of the vessel W during the flight, and the updating of the presence probability map M based on the acquired presence information of the vessel W may be performed repeatedly in order.

In contrast, when the determination is made to end the patrol route setting process (step S7: YES), the controller 18 may end the patrol route setting process. The determination to end the patrol route setting process may be made, for example but not limited to, in a case where a predetermined patrol time has elapsed.

[Effects]

In a case where a movable body is caused to perform patrol in order to capture a certain capturing target, a typical method has been a method of causing the movable body to perform patrol over the entire patrol region. The movable body may be, for example but not limited to, an aircraft. The capturing target may be a target to be captured. The patrol region may be a region in which the patrol is to be performed. In such a method, the movable body is caused to perform the patrol even in a section in which appearance frequency of the capturing target is low and therefore necessity of the patrol is low. This may lead to insufficient patrol.

For example, in a technique disclosed in JP-A No. 2013-80396, a range to be monitored is divided into mesh-shaped sections. Further, information of whether a target, i.e., the capturing target, is present in each of the mesh-shaped sections is reflected and thereby updated on an as-needed basis, on the basis of information acquired by a sensor such as radar.

This technique can be used to comprehend the appearance frequency of the capturing target in the patrol region, and to thereby perform more efficient patrol.

For example, in a case where a sensor that detects a capturing target is an image sensor, in a case where a patrol region is large, etc., it may be difficult to confirm the existence of the capturing target in a region in which the capturing target is present, unless a movable body travels into the vicinity of such a region.

In this case, it is difficult to favorably generate or utilize an appearance frequency distribution, i.e., a presence probability, of the capturing target disclosed in JP-A No. 2013-80396.

In other words, in order to perform efficient patrol, it may be required to utilize a highly-accurate presence probability distribution, and to perform patrol focused on a location having a high presence probability of the capturing target. Meanwhile, in order to generate the highly-accurate presence probability distribution, it may be necessary to perform patrol over the entire patrol region independently of the presence probability.

In contrast, according to one implementation of the technology described above, although the cell C having the high presence probability X of the vessel W is easily selected as the destination Pd by setting the destination on the basis of the probability distribution of the presence probability X of the vessel W, the bias in the selection of the determination Pd is suppressed by using the random number as the parameter for the selection. The bias in the selection of the destination Pd may be, for example but not limited to, a phenomenon that only the cell C having the high presence probability X is often selected.

Further, moving to the destination Pd that is selected with suppressed bias of easily selecting the cell C having the high presence probability X leads to less-biased patrol over the entire patrol region PA. Further, the presence information of the vessel W acquired upon the patrol is favorably reflected to the probability distribution of the presence probability X, i.e., the probability density mathematical function f(X).

This makes it possible to favorably utilize the presence probability map M of the vessel W to thereby make it easier to cause the patrol to be performed through the point having the high presence probability X. Meanwhile, this also makes it possible to favorably generate the presence probability map M with higher accuracy by causing the patrol to be performed in a less-biased manner over the entire patrol region PA. Hence, it is possible to achieve both the generation of the presence probability map M of the vessel W and the utilization of the presence probability map M of the vessel W, and thereby achieve efficient patrol.

Moreover, the setting of the destination Pd, the setting of the traveling route R to the set destination Pd, the acquisition of the presence information of the vessel W during the traveling of the aircraft 1 along the set traveling route R, and the updating of the probability distribution of the presence probability X, i.e., the probability density mathematical function f(X), based on the acquired presence information of the vessel W may be performed repeatedly.

This makes it possible to allow the latest situation of how the vessel W has appeared to be learned. It is therefore possible to improve accuracy of prediction regarding the presence of the vessel W, and thereby set the favorable destination Pd and the favorable traveling route R to the destination Pd.

Moreover, the unit time route Ru that has the greatest evaluation value regarding the aptitude for the patrol route may be sequentially selected in the plurality of unit time routes Ru. Further, the continuous series of the selected unit time routes Ru forms the traveling route R. It is therefore possible to set the favorable traveling route R that is superior in aptitude for the patrol route.

Moreover, the plurality of unit time routes Ru may be set on the basis of the aircraft performance of the aircraft 1. It is therefore possible to set the favorable traveling route R along which the aircraft 1 is able to travel with less difficulty in view of the aircraft performance of the aircraft 1.

Moreover, the evaluation value of each of the unit time routes Ru may be calculated on the basis of: the presence probability X of the vessel W in the cell C at the tip of the relevant unit time route Ru; the remaining distance to the destination Pd from the point at the tip of the relevant unit time route Ru; and the fuel consumption amount of the aircraft 1 for traveling the relevant unit time route Ru.

This makes it possible to set the favorable traveling route R taking into consideration the presence probability X of the vessel W, the remaining distance to the destination Pd, and the fuel consumption amount.

Modification Examples

Although some implementations of the technology have been described in the foregoing with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in the foregoing implementation, the aircraft 1 may start the flight after the destination Pd and the traveling route R are set. Further, the presence probability map M may be updated and the next destination Pd and the traveling route R to the next destination Pd may be set after the aircraft 1 arrives at the current destination Pd. In one implementation, however, the updating of the presence probability map M and the setting of the next destination Pd and the traveling route R to the next destination Pd may be performed on an as-needed basis during the flight to the current destination Pd. Further, in another implementation, the updating of the presence probability map M may be performed on an as-needed basis during the flight, and the destination Pd toward which the aircraft 1 is traveling at present may be variable in accordance with the update of the presence probability map M.

Moreover, in the foregoing implementation, the destination Pd may be set by the probability determination method using the Thompson sampling. However, the probability determination method is not limited to the Thompson sampling. In one implementation, the probability determination method may be any method other than the Thompson sampling as long as the bias in the selection of the destination Pd is suppressed by the probability determination method using the random number and the probability distribution of the target to be captured.

Moreover, the foregoing implementation has been described referring to an example case where the patrol route setting apparatus according to one implementation of the technology is applied to the aircraft 1. However, the movable body to which one implementation of the technology is applicable may be any movable body that performs patrol in a predetermined patrol region, and is not necessarily an aircraft. The movable body to which one implementation of the technology is applicable may be, for example but not limited to, a vehicle, a vessel, or a cleaning robot that detects litter in a room and clean up the detected litter. Further, any implementation of the technology may be applied to a patrol purpose, where the routine monitoring can be patrol.

Moreover, the patrol route setting apparatus according to one implementation of the technology is not limited to that mounted on the movable body. In one implementation, the patrol route setting apparatus according to one implementation of the technology may be provided, for example but not limited to, in fixed equipment that performs remote control of the movable body. However, it may be necessary that the information acquiring unit, e.g., the detection sensor 13 in the foregoing implementation, acquiring the presence information of the target to be captured is mounted on the movable body. Therefore, in a case where the patrol route setting apparatus is provided separately from the movable body, it is desirable that the patrol route setting apparatus receive the presence information acquired by the information acquiring unit mounted on the movable body, from the movable body by means of a communicator, etc.

The controller 18 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 18. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 18 illustrated in FIG. 2.

The invention claimed is:

1. A patrol route setting method comprising:
   dividing map information into a plurality of cells in a horizontal plane, the map information including a predetermined patrol region;
   setting, for each of the cells, a probability distribution of a presence probability of a capturing target being located in that cell, the capturing target being a target to be captured;
   generating a random number;
   setting, as a destination, any, of the cells, that has a greatest first value of first values of the respective cells, on a basis of the probability distributions set for the respective cells, the first value being a value of the presence probability corresponding to the generated random number;
   setting a traveling route from a current location of a movable body to the destination; and
   updating, on a basis of presence information, the probability distributions of the presence probability of the capturing target set for the respective cells, when the movable body travels along the set traveling route, the presence information being information regarding presence of the capturing target around the movable body, the presence information being acquired by an information acquiring unit mounted on the movable body.

2. A non-transitory storage medium that includes a patrol route setting program embodied therein, the patrol route setting program causing, when executed by a computer, the computer to implement a method, the method comprising:
   dividing map information into a plurality of cells in a horizontal plane, the map information including a predetermined patrol region;
   setting, for each of the cells, a probability distribution of a presence probability of a capturing target being located in that cell, the capturing target being a target to be captured;
   generating a random number;
   setting, as a destination, any, of the cells, that has a greatest first value of first values of the respective cells, on a basis of the probability distributions set for the respective cells, the first value being a value of the presence probability corresponding to the generated random number;
   setting a traveling route from a current location of a movable body to the destination; and
   updating, on a basis of presence information, the probability distributions of the presence probability of the capturing target set for the respective cells, when the movable body travels along the set traveling route, the presence information being information regarding presence of the capturing target around the movable body, the presence information being acquired by an information acquiring unit mounted on the movable body.

3. A patrol route setting apparatus comprising
   circuitry configured to
   divide map information into a plurality of cells in a horizontal plane, the map information including a predetermined patrol region,
   set, for each of the cells, a probability distribution of a presence probability of a capturing target being located in that cell, the capturing target being a target to be captured,
   generate a random number,
   set, as a destination, any, of the cells, that has a greatest first value of first values of the respective cells, on a basis of the probability distributions set for the respective cells, the first value for each cell being a value of the presence probability extracted from the probability distribution for that cell using the generated random number, set a traveling route from a current location of a movable body to the destination, and update, on a basis of presence information, the probability distributions of the presence probability of the capturing target set for the respective cells, when the movable body travels along the set traveling route, the presence information being information regarding presence of the capturing target around the movable body, the presence information being acquired by an information acquiring unit mounted on the movable body.

4. The patrol route setting apparatus according to claim 3, wherein the circuitry sets, for each of the cells, a probability density mathematical function as the probability distribution for that cell, the probability density mathematical function for each cell being a probability density mathematical function whose random variable is the presence probability of the capturing target being located in that cell, and the circuitry sets, as the destination, any, of the cells, that has a greatest second value of second values of the respective cells, the second value for each cell being a value of the presence probability when a value of a cumulative distribution mathematical function of that cell is the random number, the cumulative distribution mathematical function of each cell being an integral of the probability density mathematical function of that cell.

5. The patrol route setting apparatus according to claim 4, wherein the setting, by the circuitry, of the destination based on the probability distributions of the presence probability of the capturing target, the setting, by the circuitry, of the traveling route to the destination, the acquiring, by the information acquiring unit, of the presence information of the capturing target in the traveling of the movable body along the traveling route, and the updating, by the circuitry, of the probability distributions of the presence probability of the capturing target based on the acquired presence information of the capturing target are performed repeatedly in an order stated above.

6. The patrol route setting apparatus according to claim 5, wherein the movable body is an aircraft.

7. The patrol route setting apparatus according to claim 4, wherein the circuitry is further configured to:

set a plurality of unit time routes, the unit time routes each being a route per unit time that starts from the current location of the movable body;

calculate, for each of the unit time routes, an evaluation value regarding aptitude for a patrol route; and select any one, of the unit time routes, that has a greatest evaluation value of the evaluation values of the respective time routes, and moves the current location to a tip of the selected unit time route, and wherein the setting of the unit time routes, the calculating of the evaluation values, the selecting of the one of the unit time routes, and the moving of the current location of the movable body are performed repeatedly in an order stated above until the current location of the movable body reaches the destination.

8. The patrol route setting apparatus according to claim 7, wherein the circuitry sets the unit time routes on a basis of a performance of the movable body.

9. The patrol route setting apparatus according to claim 8, wherein the circuitry calculates the evaluation value for each of the unit time routes on a basis of: the presence probability of the capturing target at a point of the tip of that unit time route; a remaining distance to the destination from the point of the tip of that unit time route; and an amount of fuel to be consumed by the movable body when the movable body travels along that unit time route.

10. The patrol route setting apparatus according to claim 7, wherein the circuitry calculates the evaluation value for each of the unit time routes on a basis of: the presence probability of the capturing target at a point of the tip of that unit time route; a remaining distance to the destination from the point of the tip of that unit time route; and an amount of fuel to be consumed by the movable body when the movable body travels along that unit time route.

11. The patrol route setting apparatus according to claim 4, wherein the movable body is an aircraft.

12. The patrol route setting apparatus according to claim 3, wherein the setting, by the circuitry, of the destination based on the probability distributions of the presence probability of the capturing target, the setting, by the circuitry, of the traveling route to the destination, the acquiring, by the information acquiring unit, of the presence information of the capturing target in the traveling of the movable body along the traveling route, and the updating, by the circuitry, of the probability distributions of the presence probability of the capturing target based on the acquired presence information of the capturing target are performed repeatedly in an order stated above.

13. The patrol route setting apparatus according to claim 12, wherein the movable body is an aircraft.

14. The patrol route setting apparatus according to claim 3, wherein the circuitry is further configured to:

set a plurality of unit time routes, the unit time routes each being a route per unit time that starts from the current location of the movable body;

calculate, for each of the unit time routes, an evaluation value regarding aptitude for a patrol route; and select any one, of the unit time routes, that has a greatest evaluation value of the evaluation values of the respective time routes, and moves the current location to a tip of the selected unit time route, and wherein the setting of the unit time routes, the calculating of the evaluation values, the selecting of the one of the unit time routes, and the moving of the current location of the movable body h are performed repeatedly in an order stated above until the current location of the movable body reaches the destination.

15. The patrol route setting apparatus according to claim 14, wherein the circuitry sets the unit time routes on a basis of a performance of the movable body.

16. The patrol route setting apparatus according to claim 15, wherein the circuitry calculates the evaluation value for each of the unit time routes on a basis of: the presence probability of the capturing target at a point of the tip of that unit time route; a remaining distance to the destination from the point of the tip of that unit time route; and an amount of fuel to be consumed by the movable body when the movable body travels along that unit time route.

17. The patrol route setting apparatus according to claim 14,
wherein the circuitry calculates the evaluation value for each of the unit time routes on a basis of: the presence probability of the capturing target at a point of the tip of that unit time route; a remaining distance to the destination from the point of the tip of that unit time route; and an amount of fuel to be consumed by the movable body when the movable body travels along that unit time route.

18. The patrol route setting apparatus according to claim 3, wherein the movable body is an aircraft.

* * * * *